Oct. 4, 1932.  E. H. VODON  1,880,611
QUACK GRASS DESTROYER
Original Filed March 18, 1931  2 Sheets-Sheet 1
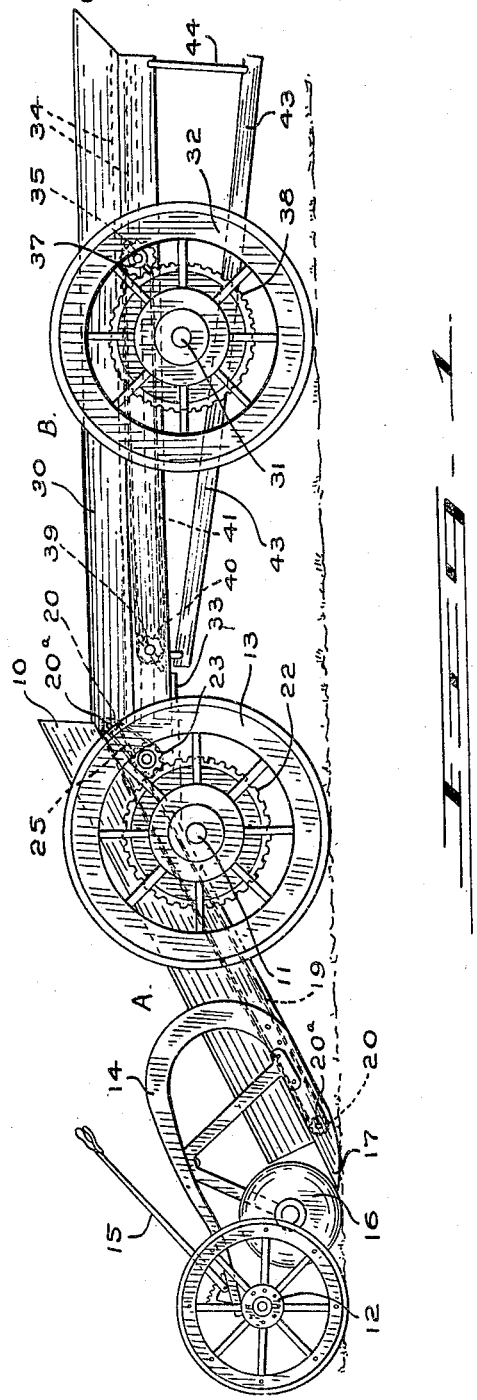
INVENTOR
Ernest H. Vodon
By Ralph Burch
Attorney.

Oct. 4, 1932.   E. H. VODON   1,880,611
QUACK GRASS DESTROYER
Original Filed March 18, 1931   2 Sheets-Sheet 2
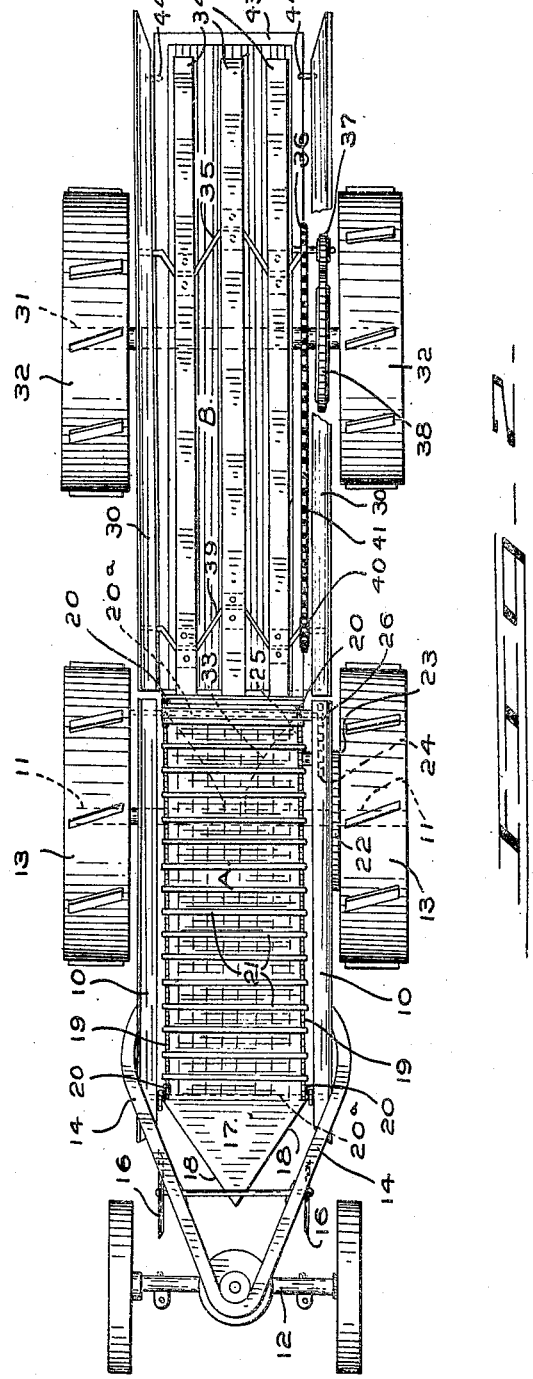
INVENTOR
Ernest H. Vodon
By
Attorney Patented Oct. 4, 1932

1,880,611

UNITED STATES PATENT OFFICE

ERNEST HENRY VODON, OF GRANDE CLAIRIERE, MANITOBA, CANADA

QUACK GRASS DESTROYER

Application filed March 18, 1931, Serial No. 523,545. Renewed July 26, 1932.

This invention relates to improvements in a couch grass destroying machine, its primary object being to dig the couch grass or other weeds from the ground, and to shake the earth from their roots then deposit the same on the top of the ground to be destroyed by exposure or the sun.

A further object is to provide such a machine that may be readily converted to a potato digger without additional expense.

A still further object is to make the device simple in construction and easy to operate.

With these and other objects in view the invention consists in the novel construction and arrangement of parts more specifically claimed and shown in the accompanying drawings forming part of this specification and in which:

Fig. 1 is a side elevation of my invention.

Fig. 2 is a plan view of the same.

Referring more in detail to the drawings in which similar reference characters designate corresponding parts throughout the several views it will be seen the invention comprises two separate members the front A and the rear B.

The front member A comprises an inclined frame 10 mounted on an axle 11 at the rear and on a truck 12 at the front. The wheels 13 are rotatably mounted on the ends of the said axle 11. A frame supporting member 14 is secured to the front end of the frame 10 and to the truck 12 and a means of raising and lowering the said frame supporting member 14 with a lever 15 to control the same. Supported on the frame support 14 are a pair of disc cutters 16 and on the front lower end of the frame 10 is a share shovel 17 having two cutting edges 18. The disc cutters 16 will cut the earth at the sides of the furrow while the share shovel 17 cuts the bottom of the same and raises the earth on to the frame 10. An endless chain conveyor carries the earth up the inclined frame 10 and drops it on the rear member B. This conveyor comprises two chains 10 mounted on sprocket wheels 20 keyed to a shaft 20a which is supported in the frame 10. A plurality of lateral members 21 are secured to both chains and form the means of carrying the earth over the frame 10. The conveyor is driven by means of a large gear wheel 22 fastened to the wheel 13 and engaging a smaller gear wheel 23 which is mounted on a shaft supported on the frame 10, a sprocket wheel 24 is secured to the said gear wheel 23 while a chain 25 connects the said sprocket 24 to a similar sprocket 26 secured to the shaft 20a on which are keyed the drive sprockets of the conveyor chain.

The rear portion B consists of a frame 30 supported on the rear axle 31 and a pair of wheels 32. At the front of the said frame is a hook 33 by which the rear portion B is attached to the front portion A. Within the frame 30 are a plurality of shaker bars 34 mounted on a crank shaft 35, said crank shaft being mounted on the frame 30 and having a sprocket 36 and a gear 37 keyed thereto, a large drive gear 38 secured to the wheel 32 engages the gear 37 and revolves the crank shaft 35 as the machine proceeds. At the front end of the frame is a similar crank shaft 39 mounted in the frame 30 and having the shaker bars 34 mounted thereon, a sprocket 40 and a chain 41 provide means of revolving this crank shaft 39 the said chain 41 being connected to the sprocket 36. A secondary shaker deck 43 is suspended below the frame 30. The rear end being supported on a swinging member 44 at the rear and the front being connected to a pair of shaker bars which provide the motion for the deck 43.

It will be seen that as the machine is drawn forward the sides of the furrow are cut by the discs and the bottom by the shovel the earth grass weeds etc. are then carried by the conveyor and deposited on the rear portion B. First on the shaker bars the larger roots and weeds being shook until they drop off the end of the bars. The earth and smaller weeds will drop through between the bars to the lower shaker deck and the shaking motion will cause the earth to fall through while the weeds, grass etc., will be carried to the rear and dropped onto the surface of the ground.

When it is desired to use the machine as a potato digger the rear portion B is unhooked and the front portion A is used alone the earth and potatoes will fall off the end of the conveyor onto the ground behind the machine.

It is believed that the construction and advantages of the structure may be apparent from the foregoing paragraphs taken in conjunction with the accompanying drawings without further detailed description.

While the preferred embodiment of the invention has been disclosed it is understood that minor changes in the details of construction, combination and arrangement of cooperating elements may be resorted to within the scope of what is claimed without departing from the spirit of the invention.

What I claim is:

In a machine of the type described, an inclined wheeled frame, a front truck supporting the forward end of said frame, a share shovel secured to the front lower end of said frame, an endless conveyor mounted in said frame, means for driving said conveyor, a rear wheeled frame connected to said inclined frame at its upper end, a pair of spaced crank shafts mounted in said rear frame, spaced longitudinal shaker bars connected to the cranks of said crank shafts, secondary shaker bars disposed on an inclined plane beneath said main shaker bars, the upper ends of said secondary shaker bars being operatively connected to said main shaker bars, swinging hangers depending from said rear wheeled frame, supporting the lower end of said secondary shaker bars and means for driving said crank shafts whereby a reciprocating movement is imparted to said main and secondary shaker bars.

In testimony whereof I affix my signature.

ERNEST HENRY VODON.